US012436627B2

(12) United States Patent
Yamazaki et al.

(10) Patent No.: US 12,436,627 B2
(45) Date of Patent: Oct. 7, 2025

(54) INPUT DEVICE WITH VIBRATION GENERATOR AND INFORMATION PROCESSING SYSTEM

(71) Applicant: Lenovo (Singapore) Pte. Ltd., Singapore (SG)

(72) Inventors: Mitsuhiro Yamazaki, Kanagawa (JP); Keiichi Yoshitomi, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/428,054

(22) Filed: Jan. 31, 2024

(65) Prior Publication Data

US 2024/0319803 A1 Sep. 26, 2024

(30) Foreign Application Priority Data

Mar. 23, 2023 (JP) ................................ 2023-047033

(51) Int. Cl.
*G06F 3/0354* (2013.01)
*G06F 3/038* (2013.01)

(52) U.S. Cl.
CPC .......... *G06F 3/03545* (2013.01); *G06F 3/038* (2013.01)

(58) Field of Classification Search
CPC ............................ G06F 3/03545; G06F 3/038
See application file for complete search history.

(56) References Cited

U.S. PATENT DOCUMENTS 5,541,375 A * 7/1996 Dam ...................... H01H 13/08 200/61.42
2006/0022958 A1* 2/2006 Shiga .................... G06F 3/0421 345/173
2010/0220078 A1* 9/2010 Zloter .................. G06F 3/0433 345/177
2011/0219892 A1* 9/2011 Fukushima ........... G06F 3/0416 73/865.4
2013/0199311 A1* 8/2013 Horie ...................... G06F 3/046 73/862.626
2017/0108928 A1 4/2017 Clements et al.
2017/0262086 A1* 9/2017 Ogata ..................... G06F 3/038
2017/0285774 A1* 10/2017 Parikh ..................... G06F 3/167
2022/0209638 A1* 6/2022 Hirata .................... H02K 33/16

FOREIGN PATENT DOCUMENTS

JP H06-110595 A 4/1994
JP H06-242876 A 9/1994
JP 2005-309859 A 11/2005
JP 2022-187411 A 12/2022
WO 2018/030266 A1 2/2018

* cited by examiner

*Primary Examiner* — Sanghyuk Park
(74) *Attorney, Agent, or Firm* — Osha Bergman Watanabe & Burton LLP

(57) ABSTRACT

A pen-shaped input device includes: an elongated rod-shaped housing having a tip end and extending in an axial direction that extends in the longitudinal direction; a pen-tip section that protrudes from the tip end of the housing; and a vibration generator that is supported inside the housing and generates vibrations along the axial direction.

12 Claims, 5 Drawing Sheets

INPUT DEVICE WITH VIBRATION GENERATOR AND INFORMATION PROCESSING SYSTEM

CROSS-REFERENCE TO RELATED APPLICATIONS

This application claims priority to Japanese Patent Application No. 2023-047033 filed on Mar. 23, 2023, the contents of which are hereby incorporated herein by reference in their entirety.

TECHNICAL FIELD

The present invention relates to a pen-shaped input device, and an information processing system including the input device and an information processing apparatus.

BACKGROUND

Information processing apparatuses such as laptop PCs, tablet terminals, and smartphones may be used with a pen-shaped input device for input operations on the touchscreen. For instance, Japanese Unexamined Patent Application Publication No. 2022-187411 discloses a touch pen used for input to the touch panel, and the touch pen includes a vibration generator that vibrates in the direction perpendicular to the axial direction of the rod-shaped housing.

An input device including a vibration generator as described above is also called a haptic pen and has a tactile feedback function. Tactile feedback is used to improve the usability by generating vibrations in response to a contact with the touchscreen that displays text and other information. To this end, conventional vibration generators vibrate back and forth in the direction perpendicular to the axial direction of the housing, as described in Japanese Unexamined Patent Application Publication No. 2022-187411, which is designed to directly transmit the vibrations to the user's fingers.

Note here that typical writing instruments such as pencils and ballpoint pens contribute to, in addition to vibrations, the sound generated during writing (writing sound) for better usability. Conventional input devices, however, are not designed to take such writing sound into account.

SUMMARY

One or more embodiments of the present invention provide an input device and an information processing system capable of improving the usability.

An input device according to one or more embodiments of the present invention is a pen-shaped input device, and includes: an elongated rod-shaped housing having a tip end and extending in an axial direction that extends in the longitudinal direction; a pen-tip section that protrudes from the tip end of the housing; and a vibration generator that is supported inside the housing and generates vibrations along the axial direction.

An information processing system according to one or more embodiments of the present invention includes: an information processing apparatus, and a pen-shaped input device. The input device includes: an elongated rod-shaped housing having a tip end and extending in an axial direction that extends in the longitudinal direction; a pen-tip section that protrudes from the tip end of the housing; and a vibration generator that is supported inside the housing and generates vibrations along the axial direction.

The above-described aspects of present invention improve the usability.

DETAILED DESCRIPTION

Figure 1:
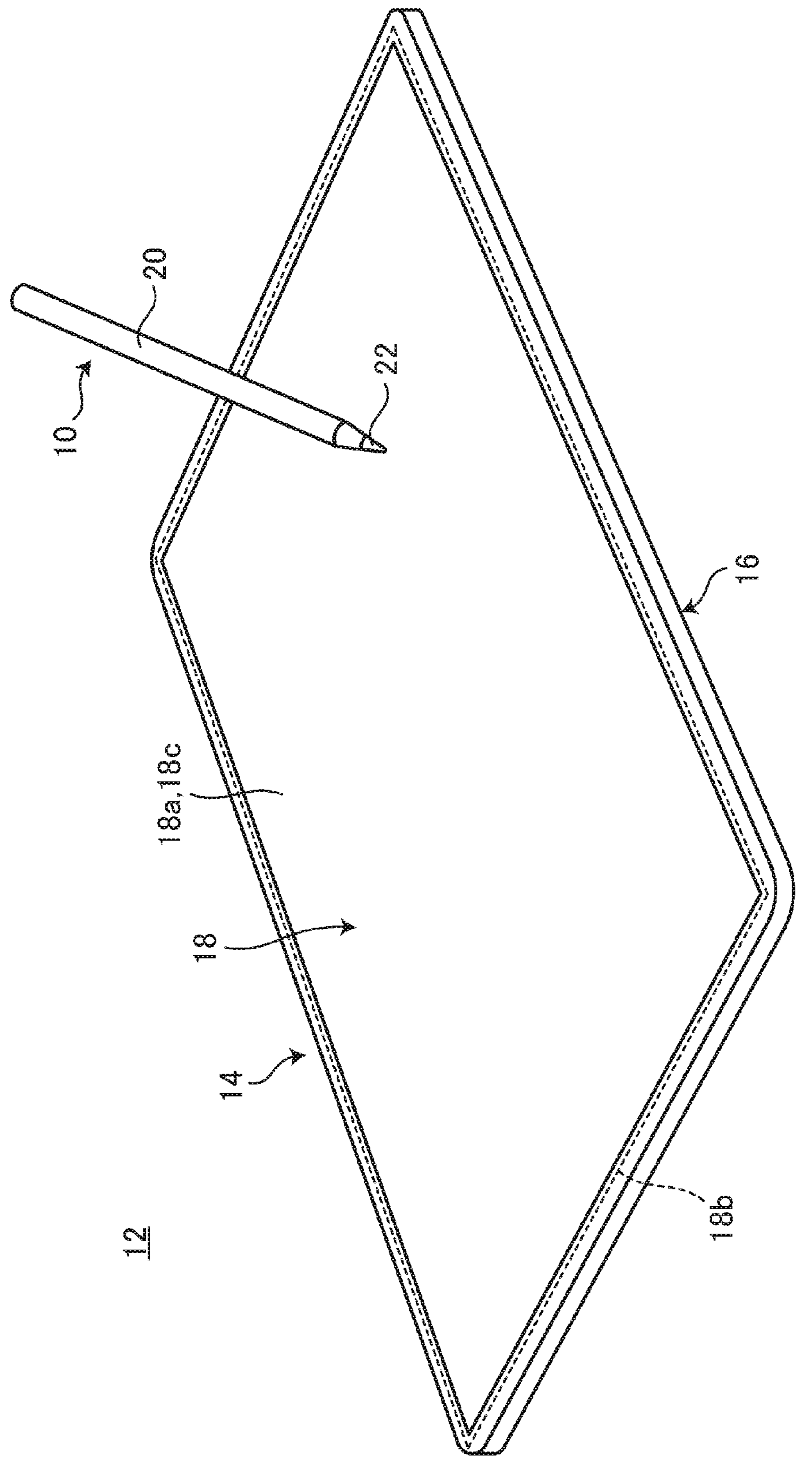
FIG. 1 is a schematic perspective view of an example configuration of an information processing system including an input device according to one or more embodiments.

Referring to the drawings, the following describes an input device and an information processing system according to the present invention in details by way of one or more embodiments.

FIG. 1 is a schematic perspective view of an example configuration of an information processing system 12 including an input device 10 according to one or more embodiments. The input device 10 has a pen shape and is used for input operations to the information processing apparatus 14. The input device 10 is also called a digital pen, stylus, electronic pen, smart pen, or the like. One or more embodiments exemplifies a tablet terminal that is the information processing apparatus 14. The information processing apparatus, with which the input device 10 is to be used, can be other than a tablet device, such as a laptop PC or a smartphone.

The information processing apparatus 14 has a chassis 16 having a thin, flat, planar shape, and a touchscreen 18 covering one face of the chassis 16. The chassis 16 internally accommodates various electronic components, such as a motherboard on which the CPU and other processing devices are mounted and a battery device.

The touchscreen 18 includes a display unit 18*a* and a touch sensor 18*b*. The display unit 18*a* includes liquid crystal, organic EL, or the like, and displays various types of information. The touch sensor 18*b* is superimposed on the surface of the display unit 18*a*. The touch sensor 18*b* is a touch panel capable of detecting input operations with the input device 10 on the surface 18*c* of the touchscreen 18. The information processing apparatus 14 is capable of monitoring the presence or not of an input operation, identifying the position where the input operation is detected, and executing data inputting or editing based on the input operation. For instance, the information processing apparatus 14 causes the display unit 18*a* to display the locus of the contact position where the input device 10 comes in contact with the touch sensor 18*b*.

Figure 2:
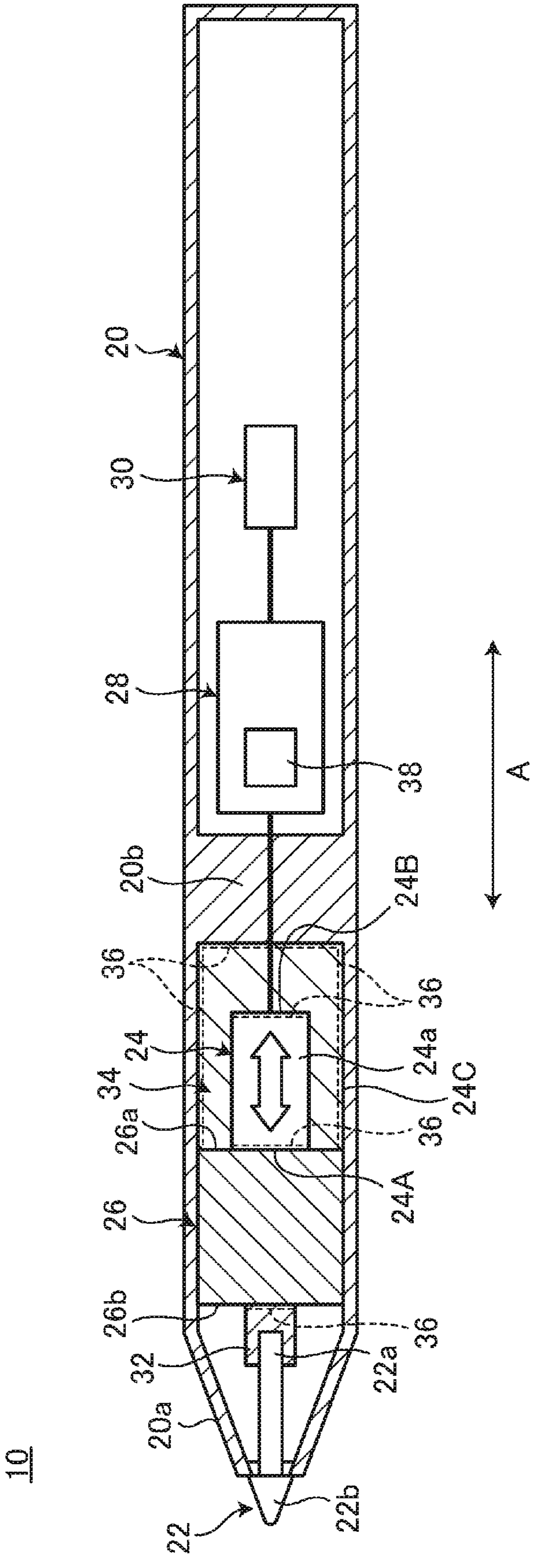
FIG. 2 is a schematic cross-sectional view of the internal structure of the input device.

FIG. 2 is a schematic cross-sectional view of the internal structure of the input device 10.

A user holding the input device 10 moves the input device 10 while letting it come in contact with the surface 18*c* of the touchscreen 18, whereby the user is allowed to use the input device 10 to input and edit data such as characters, symbols, and figures. As illustrated in FIG. 2, the input device 10 includes a housing 20, a pen-tip section 22, a vibration generator 24, a vibration transmitter 26, a circuit board 28, and a wireless communication unit 30. A battery device and others are further placed inside the housing 20 of the input device 10. In FIG. 2, the thick lines connecting the vibration generator 24, the circuit board 28, and the wireless communication unit 30 indicate that they are electrically connected to each other by wiring, for example. The same applies to FIGS. 4 and 5.

The housing 20 is an elongated rod-shaped cylinder made of resin, wood, metal or other materials. The housing 20 can have various cross-sectional shapes, such as a perfect-circle or elliptical cylinder, and a rectangular cylinder. The housing 20 has a length and thickness suitable for being held by human's hand, similar to a writing instrument such as a pencil or a ballpoint pen.

The pen-tip section 22 is an input unit to the touchscreen 18. The pen-tip section 22 is configured to protrude from the tip end 20*a* of the housing 20. For instance, the tip end 20*a* has a truncated cone shape with a tapered shape. The pen-tip section 22 protrudes from the center of the tip end 20*a* along the axial direction A of the housing 20. The axial direction A extends in the longitudinal direction of the elongated rod-shaped housing 20. The pen-tip section 22 has a thin rod-shaped proximal end 22*a* supported by a holder 32 within the housing 20, and a conical pen tip 22*b* exposed outside the housing 20. The holder 32 is a component that is supported internally near the tip end of the housing 20 and supports the pen-tip section 22 removably or non-removably.

The vibration generator 24 vibrates according to a drive signal supplied from the information processing apparatus 14 via the circuit board 28. The vibration generator 24 is supported on the inner peripheral surface of the housing 20 via a bracket 34. For instance, the vibration generator 24 is made up of a linear resonant actuator (LRA), and includes an actuator 24*a* that vibrates back and forth (see also FIG. 3). The vibration generator 24 is placed so that the vibration direction of the actuator 24*a* is along the axial direction A. This causes the vibration generator 24 to generate vibrations along the axial direction A within the housing 20.

The vibration transmitter 26 efficiently transmits the vibrations generated by the vibration generator 24 to the pen-tip section 22. The vibration transmitter 26 is formed of a rigid body such as a hard resin or metal that is made into a block shape, and has high vibration transmission efficiency. The vibration transmitter 26 has a first end 26*a* on one side in the axial direction A, and the first end 26*a* is fixed to the front face 24A of the vibration generator 24 (actuator 24*a*). The vibration transmitter 26 has a second end 26*b* on the other side in the axial direction A, and the second end 26*b* is fixed to the holder 32. This fixes the vibration transmitter 26 relative to the pen-tip section 22. For instance, the vibration transmitter 26, the vibration generator 24, and the holder 32 are fixed firmly with an adhesive 36 without rattling. The pen-tip section 22 may be directly supported by the housing 20 without the holder 32. In this case, the second end 26*b* may be directly fixed to the pen-tip section 22.

The bracket 34 is a massive member made of resin or metal, for example. For instance, the bracket 34 is a columnar member with a hole in the front end face that accommodates the vibration generator 24. The bracket 34 firmly covers the rear face 24B and side face 24C of the vibration generator 24 to prevent vibrations from escaping. The rear face 24B is opposite to the front face 24A, which is a connection face of the vibration generator 24 to the vibration transmitter 26. The side face 24C is an outer peripheral surface located between the front face 24A and the rear face 24B. The bracket 34 is firmly secured to the housing 20, simultaneously transmitting vibrations to the housing 20 and the fingers holding the housing 20. For instance, the bracket 34, vibration generator 24, and housing 20 are fixed firmly with an adhesive 36 without rattling. Reference numeral 20*b* in FIG. 2 is a knot-shaped member that fills the internal space of the housing 20 in a direction perpendicular to the axial direction A. This member is part of the housing 20 and is secured to the rear face of the bracket 34.

The circuit board 28 is supported within the housing 20. The circuit board 28 is a control board for the input device 10, and has a micro controller unit (MCU) 38 mounted thereon, for example. The MCU 38 is a processing device that comprehensively controls the functions of the input device 10. The MCU 38 includes a processor, memory such as ROM and RAM, and various input/output interfaces. The MCU 38 operates independently of the information processing apparatus 14.

The wireless communication unit 30 is a wireless communication module that transmits and receives wireless data to and from the wireless communication unit 46 (see FIG. 3) of the information processing apparatus 14.

Next, the following describes an example of the functional configuration of the information processing system 12.

Figure 3:
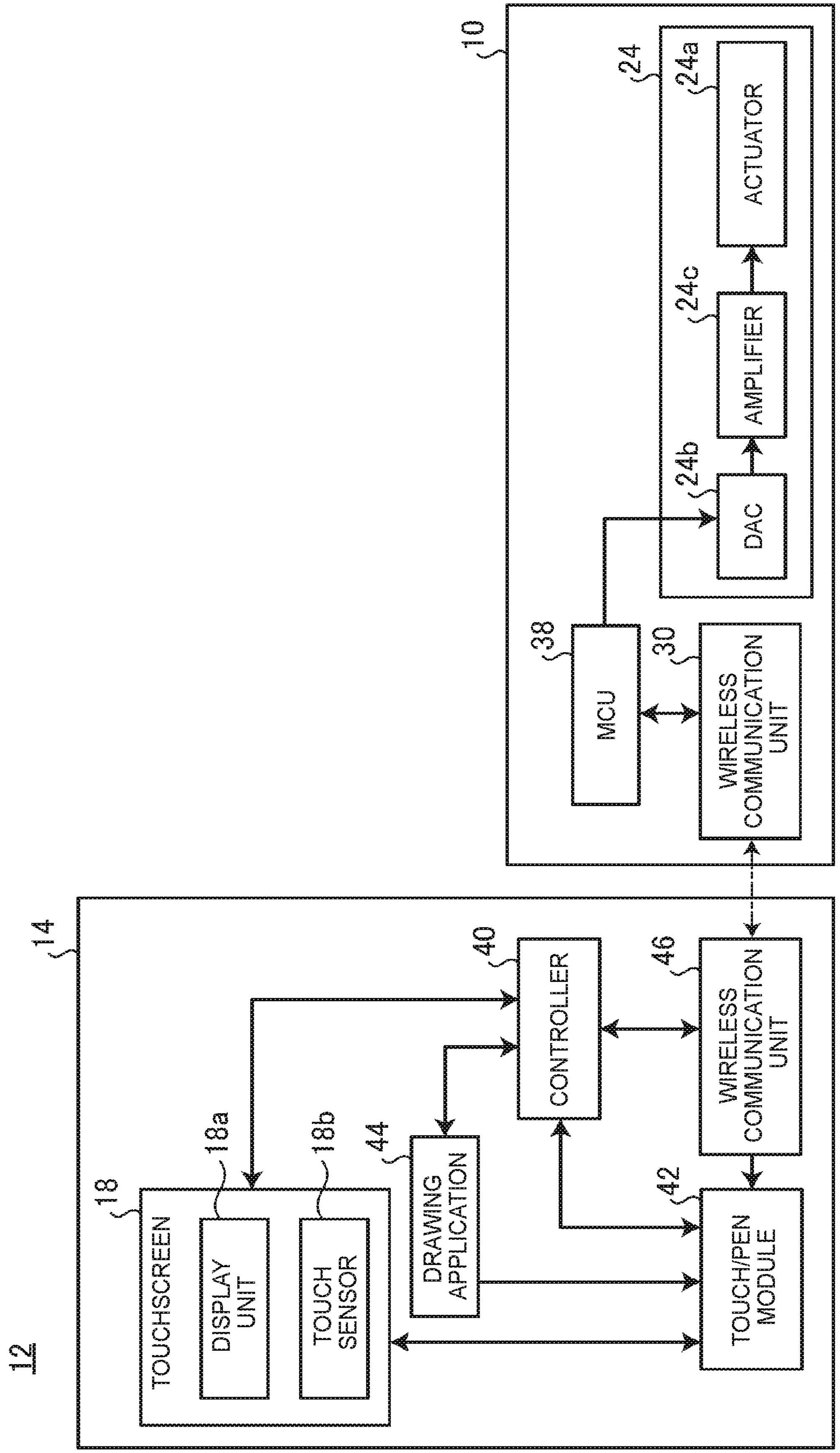
FIG. 3 is a block diagram illustrating one example of the functional configuration of an information processing system according to one or more embodiments.

FIG. 3 is a block diagram illustrating one example of the functional configuration of the information processing system 12 according to one or more embodiments. As illustrated in FIG. 3, the information processing system 12 includes the information processing apparatus 14 and the input device 10.

The information processing apparatus 14 includes the touchscreen 18, a controller 40, a touch/pen module 42, a drawing application 44, and the wireless communication unit 46. The touchscreen 18 has the display unit 18*a* and the touch sensor 18*b* as described above.

The controller 40 comprehensively controls the functions of the information processing apparatus 14. The controller 40 may be implemented through the execution of a program by a processor such as a CPU (i.e., by software), or may be implemented by hardware, such as an integrated circuit (IC). The controller may be implemented by software and hardware. The controller 40 of one or more embodiments includes software such as an operating system (OS) and a processor such as a CPU.

The touch/pen module 42 cooperates with the controller 40 to control the touchscreen 18 and the input device 10. The touch/pen module 42 may be configured as a sub-card connected to a motherboard on which a CPU or the like is mounted, for example. The drawing application 44 is application software that controls the touchscreen 18 and input device 10 via the touch/pen module 42. The wireless communication unit 46 is a wireless communication module that transmits and receives wireless data to and from the wireless communication unit 30 of the input device 10.

The input device 10 includes the MCU 38, the wireless communication unit 30, and the vibration generator 24.

The MCU 38 receives vibration control information and sound control information from the information processing apparatus 14 using the wireless communication unit 30. For instance, the sound control information and vibration control information is information that lets the touch/pen module 42, which also cooperates with the controller 40, control the vibration frequency and others during input operations with the input device 10 to the touchscreen 18, and at the same time control the volume, frequency, and others of the sound (writing sound) generated by the vibrations. The MCU 38 uses this control information to synthesize a drive signal. The MCU 38 outputs the synthesized drive signal to the vibration generator 24.

The vibration generator 24 includes an actuator 24*a*, a DAC 24*b*, and an amplifier 24*c*. The digital-to-analog converter (DAC) 24*b* converts the digital drive signal input from the MCU 38 into an analog drive signal. The DAC 24*b* outputs the converted analog drive signal to the amplifier 24*c*. The amplifier 24*c* adjusts the amplitude of the drive signal input from the DAC 24*b*, and outputs the drive signal with the adjusted amplitude to the actuator 24*a*. The actuator 24*a* is a vibration generation source that generates vibrations according to a drive signal input from the amplifier 24*c*, and is also a sound generation source that generates sound based on the generated vibrations.

Next, the following describes the input operation with the input device 10 and the advantageous effects.

Figure 4:
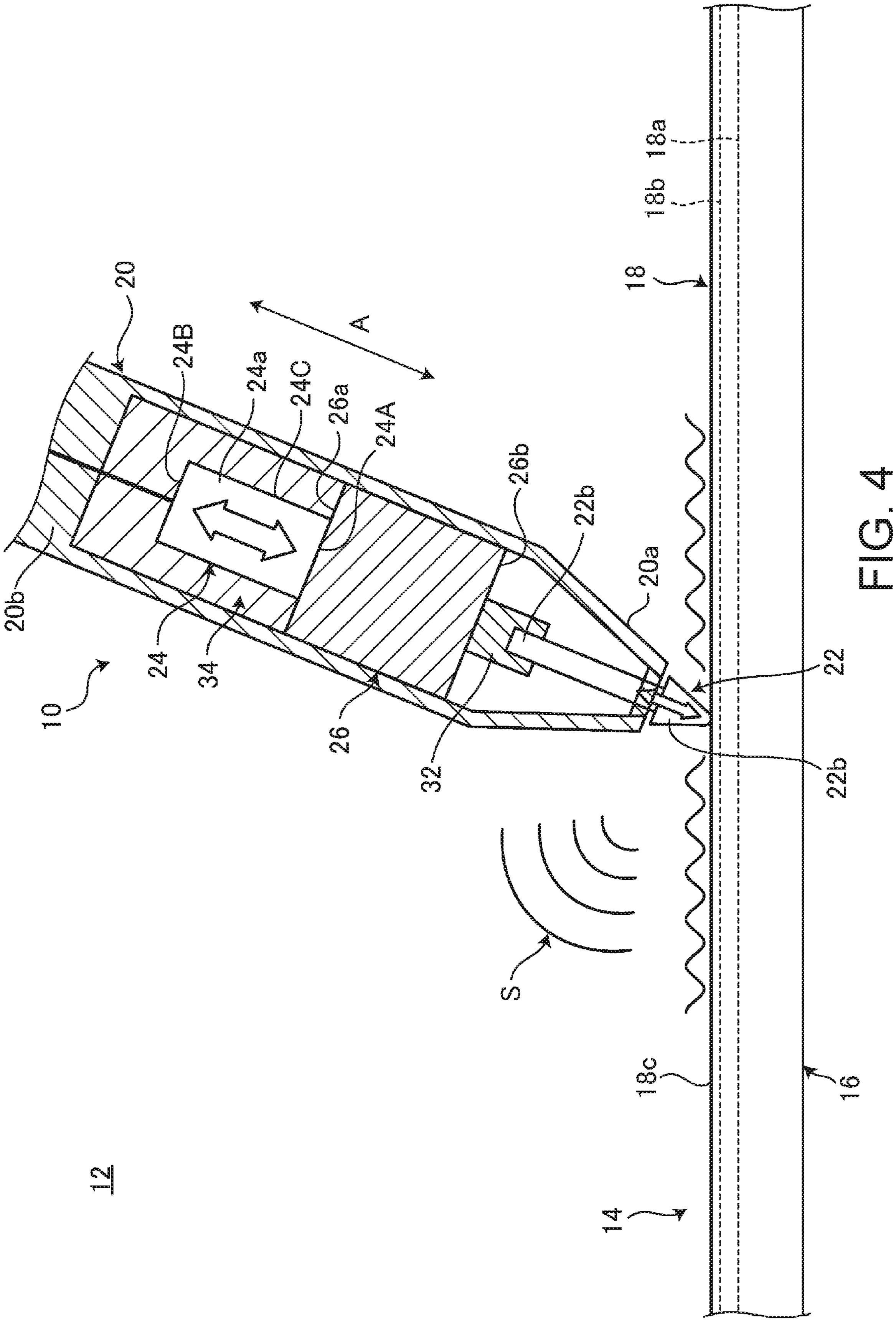
FIG. 4 schematically illustrates the input operation to the information processing apparatus using the input device according to one or more embodiments.

FIG. 4 schematically illustrates the input operation to the information processing apparatus 14 using the input device 10. As illustrated in FIG. 4, the input operation with the input device 10 moves the pen tip 22*b* in contact with the surface 18*c* of the touchscreen 18. The input device 10 then receives control information from the touch/pen module 42 through the drawing application 44 and controller 40. Based on this control signal, the input device 10 inputs a predetermined drive signal to the vibration generator 24 under the control of the MCU 38 to drive the actuator 24*a* and generate vibrations.

The actuator 24*a* of one or more embodiments generates vibrations along the axial direction (longitudinal direction) A of the rod-shaped housing 20, and at the same time generates sound due to the vibrations. Vibrations including the sound signal from the actuator 24*a* are transmitted from the pen tip 22*b* to the surface 18*c* of the touchscreen 18 via the vibration transmitter 26 and are diffused over the surface 18*c*. The wavy lines on the surface 18*c* in FIG. 4 schematically illustrate the spread of vibrations and sound transmitted from the pen tip 22*b* to the surface 18*c*.

The sound produced by the actuator 24*a* is thereby diffused and amplified on the surface 18*c* to produce a sound S that is fully perceived with the user's hearing. As a result, the user is allowed to perform an input operation while listening to the sound S as a writing sound from the input device 10, and obtains a high usability similar to that of a writing instrument such as a pencil or a ballpoint pen. For instance, the effect of the vibrations from the pen tip 22*b* being amplified on the surface 18*c* can be said similar to the effect that, when a vibrating tuning fork is applied to a flat surface such as a wall, the vibrations are transmitted and the sound is heard louder.

Note that conventional haptic pens are typically designed to improve the usability through tactile sensation by giving vibrations to the user. To this end, the vibration direction of the actuator is set in a direction perpendicular to the axial direction of the housing. The vibrations of these actuators are set to resonate at a frequency of about 150 to 300 Hz, which is a frequency that humans can easily feel. Therefore, conventional haptic pens have difficulty in generating sufficient sound through vibrations.

In this regard, the input device 10 of one or more embodiments has the vibration generator 24 that is supported inside the housing 20 and generates vibrations along the axial direction A of the housing 20. With this configuration, this input device 10 enables efficient transmission of the vibrations in the axial direction A from the vibration generator 24 and the sound generated in synchronization with the vibrations to the pen-tip section 22. The vibrations and sound transmitted to the pen-tip section 22 are efficiently transmitted to the surface 18*c* of the touchscreen 18. As a result, the input device 10 improves the user's usability because the sound S amplified by the surface 18*c* is generated from the vicinity of the pen tip 22*b*, allowing the user to hear a good writing sound equivalent to that of a typical writing instrument.

The input device 10 is configured so that the sound S is generated by the vibration generator 24 placed within the housing 20. This also leads to another advantage that the input device 10 has a further improved usability due to, in addition to the sound S emitted from the vicinity of the pen tip 22*b*, the vibrations directly transmitted from the vibration generator 24 to the fingertips.

The input device 10 may be configured so as to generate the writing sound from a speaker of the information processing apparatus 14, for example. In this case, however, although the speaker can produce sufficient volume, it is difficult to synchronize the position of the sound generation and the vibrations, which may cause discomfort to the user. In this respect, the input device 10 of one or more embodiments enables synchronization of the sound generation position with the writing position because the sound S is generated from the vicinity of the pen tip 22*b*. The input device 10 also enables synchronization of the sound S and vibrations, which has the advantage of giving a high usability without discomfort.

The input device 10 may be configured so that the resonance frequency of the vibrations at the vibration generator 24 may be set to a frequency that cannot be felt by humans (e.g., 500 Hz or higher), so as to implement the control that gives a sense of use with only sound S. This control may be realized, for example, by switching a low-pass filter as needed, the low-pass filter being mounted on the circuit board 28 and cutting frequencies less than 500 Hz under the control of the controller 40 of the information processing apparatus 14. In this way, the input device 10 is operable to give only writing sounds to users who are not comfortable with vibrations. This improves the versatility of the input device 10.

The input device 10 may include the vibration transmitter 26 that is located between the vibration generator 24 and the pen-tip section 22 and transmits the vibrations at the vibration generator 24 to the pen-tip section 22. This configuration more efficiently transmits vibrations generated at the vibration generator 24 to the pen-tip section 22, thus increasing the volume of the sound S more. In particular, the vibration transmitter 26 may be a rigid body. This is favorable because it allows the vibrations at the vibration generator 24 to be transmitted to the pen-tip section 22 even more efficiently. The input device 10 includes the holder 32 supporting the pen-tip section 22 and vibration transmitter 26 that are fixed, so that vibration transmission can be made more efficient.

The input device 10 may include the bracket 34 that firmly covers the rear face 24B and side face 24C of the vibration generator 24 and is fixed to the housing 20. This prevents the vibrations generated at the vibration generator 24 from being attenuated via the rear face 24B and side face 24C. This also enhances the efficiency of vibration transmission to the pen-tip section 22 and vibration transmitter 26, and at the same time, enhances the efficiency of vibration transmission to the housing 20 and the fingers holding the housing 20. The vibration transmitter 26 may be omitted and the vibration generator 24 and holder 32 may be directly connected. In this case also, the input device 10 includes the bracket 34, so that the vibrations at the vibration generator 24 are efficiently transmitted to the pen-tip section 22.

Figure 5:
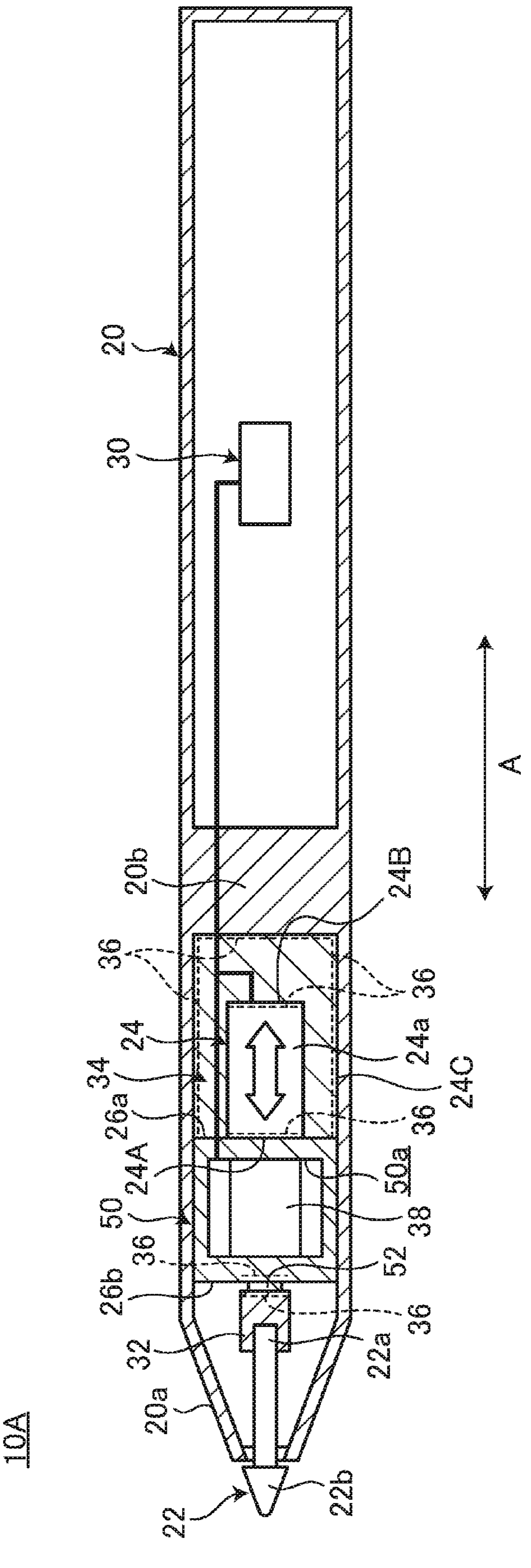
FIG. 5 is a schematic cross-sectional view of the internal structure of an input device according to a modified example of one or more embodiments.

FIG. 5 is a schematic cross-sectional view of the internal structure of an input device 10A according to a modified example. In FIG. 5, like reference numerals indicate like parts having the same or similar configurations in FIGS. 1 through 4 and thus the same functions and advantageous effects, and their detailed description are omitted.

The input device 10A illustrated in FIG. 5 includes a vibration transmitter 50 having a different configuration from the vibration transmitter 26 of the input device 10 illustrated in FIG. 2. The vibration transmitter 26 described above includes a rigid body that is a block. The vibration transmitter 50 includes a rigid body with a hollow 50*a* inside. The material and others of the vibration transmitter 50 may be the same as or similar to the vibration transmitter 26. The hollow 50*a* of the vibration transmitter 50 houses the circuit board 28, for example, which may be fixed with adhesive.

The input device 10A further includes a sensor 52 located between a second end 26*b* of the vibration transmitter 50 and the holder 32 and fixed to each of them with an adhesive 36. For instance, the sensor 52 detects a contact of the pen-tip section 22 with the surface 18*c*.

The input device 10A also outputs sound S without discomfort, similar to the input device 10 described above, so that it improves the usability. The input device 10A includes the vibration transmitter 50 stored in the housing 20, and easily keeps the space for housing the vibration transmitter 50. In other words, the input device 10A is configured to fix electronic components such as the circuit board 28 and the sensor 52 to the vibration transmitter 50, thereby allowing for the installation space and stable support for these electronic components. The sensor 52 may be interposed between the holder 32 and the vibration transmitter 26 also in the input device 10 illustrated in FIG. 2, or may be placed at another position.

The present invention is not limited to the above-described embodiments, and can be modified freely without deviating from the scope of the present invention.

DESCRIPTION OF SYMBOLS

- 10, 10A input device
- 12 information processing system
- 14 information processing apparatus
- 18 touchscreen
- 20 housing
- 20*a* tip end
- 22 pen-tip section
- 22*b* pen tip
- 24 vibration generator
- 24*a* actuator
- 26, 50 vibration transmitter

What is claimed is:

1. A pen-shaped input device comprising:

an elongated rod-shaped housing having a tip end and extending in an axial direction that extends in a longitudinal direction;

a pen-tip section that protrudes from the tip end of the housing;

a vibration generator that includes:

a digital-to-analog converter (DAC);

an actuator that generates vibrations along the axial direction based on vibration control information from the DAC; and a connection face that transmits the vibrations of the actuator to the pen-tip section via a connector that is mechanically connected to the connection face; and a bracket with columnar shape that supports the vibration generator inside the housing, wherein the bracket includes:

a front face that includes a recessed portion that accommodates the vibration generator and a front face surface that contacts the connector;

a rear face that includes a rear face surface that is fixed to a solid housing portion that fills an internal space of the housing in a direction perpendicular to the axial direction; and a side face that includes a side face surface that is fixed to an inner surface of the housing, wherein the recessed portion of the bracket is fixed to a rear face of the vibration generator opposite to the connection face of the vibration generator, and contacts a side face of the vibration generator located between the connection face of the vibration generator and the rear face of the vibration generator.

2. The input device according to claim 1, wherein the connector includes a rigid body, and has a first end on one side in the axial direction and a second end on the other side, the first end being fixed to the connection face of the vibration generator, the second end being fixed to the pen-tip section.

3. The input device according to claim 2, further comprising a holder that supports the pen-tip section inside the housing, wherein the holder is fixed to the second end of the connector, so that the pen-tip section is fixed relative to the connector.

4. The input device according to claim 3, further comprising an electronic component that controls driving of the input device, wherein the electronic component is fixed to the connector.

5. The input device according to claim 2, further comprising a sensor that detects contact of the input device with an external surface, wherein the sensor is fixed to the second end of the connector and to a holder that supports the pen-tip section inside the housing.

6. The input device according to claim 1, wherein the DAC is configured to receive a drive signal that includes the vibration control information and sound control information, the sound control information and vibration control information correspond to different frequency ranges.

7. The input device according to claim 6, wherein the actuator generates the vibrations based on the vibration control information and generates sound based on the sound control information.

8. The input device according to claim 7, wherein the connector transmits the sound from the actuator to the pen-tip section.

9. The input device according to claim 7, further comprising a filter that is configured to separate the different frequency ranges of the sound control information and the vibration control information such that the vibration generator generates one of the vibrations or the sound based on a setting of the filter.

10. The input device according to claim 1, wherein the connector includes a hollow center.

11. The input device according to claim 10, further comprising an electronic component that controls driving of the input device, wherein the electronic component is disposed in the hollow center of the connector.

12. An information processing system comprising an information processing apparatus, and a pen-shaped input device, the input device including:

an elongated rod-shaped housing having a tip end and extending in an axial direction that extends in a longitudinal direction;

a pen-tip section that protrudes from the tip end of the housing;

a vibration generator that includes:

a digital-to-analog converter (DAC); and an actuator that generates vibrations along the axial direction based on vibration information from the DAC; and a connection face that transmits the vibrations of the actuator to the pen-tip section via a connector that is mechanically connected to the connection face; and a bracket with columnar shape that accommodates the vibration generator, wherein the bracket includes:

a front face that includes a recessed portion that accommodates the vibration generator and a front face surface that contacts the connector;

a rear face that includes a rear face surface that is fixed to a solid housing portion that fills an internal space of the housing in a direction perpendicular to the axial direction; and a side face that includes a side face surface that is fixed to an inner surface of the housing, wherein the recessed portion of the bracket is fixed to a rear face of the vibration generator opposite to the connection face of the vibration generator, and contacts a side face of the vibration generator located between the connection face of the vibration generator and the rear face of the vibration generator.

* * * * *